(12) United States Patent
Chelminski

(10) Patent No.: US 8,223,591 B2
(45) Date of Patent: Jul. 17, 2012

(54) DEVICE FOR MARINE SEISMIC EXPLORATION FOR DEPOSITS

(76) Inventor: Stephen Chelminski, Antrim, NH (US)

( * ) Notice: Subject to any disclaimer, the term of this patent is extended or adjusted under 35 U.S.C. 154(b) by 0 days.

(21) Appl. No.: 12/802,789

(22) Filed: Jun. 14, 2010

(65) Prior Publication Data

US 2010/0320027 A1    Dec. 23, 2010

Related U.S. Application Data

(60) Provisional application No. 61/268,936, filed on Jun. 18, 2009.

(51) Int. Cl.
*G01V 1/137* (2006.01)
*G01V 1/04* (2006.01)
*F41B 11/00* (2006.01)

(52) U.S. Cl. .................. 367/144; 181/120; 124/56

(58) Field of Classification Search .......... 367/144
See application file for complete search history.

(56) References Cited

U.S. PATENT DOCUMENTS

| | | | | |
|---|---|---|---|---|
| 4,472,794 A | * | 9/1984 | Chelminski | 367/144 |
| 4,712,202 A | * | 12/1987 | Chelminski | 367/144 |
| 4,712,641 A | * | 12/1987 | Chelminski | 181/113 |
| 4,754,443 A | * | 6/1988 | Chelminski | 367/144 |
| 4,779,245 A | * | 10/1988 | Chelminski | 367/144 |
| 5,432,757 A | * | 7/1995 | Chelminski | 367/144 |
| 5,978,316 A | * | 11/1999 | Ambs et al. | 367/134 |
| 2006/0021609 A1 | * | 2/2006 | Jensen | 124/56 |
| 2008/0019214 A1 | * | 1/2008 | Pramik | 367/16 |

* cited by examiner

*Primary Examiner* — Thomas Tarcza
*Assistant Examiner* — James Hulka
(74) *Attorney, Agent, or Firm* — George W. Dishong

(57) ABSTRACT

The device hereof is most preferably an improved performance air gun as sound source for marine seismic exploration for petroleum deposits and it most generally is comprised of, an elongated cylindrical housing bored from each end to a fixed radial wall separating the two bores. The fixed radial wall having a through bore for hollow shaft of air control and release shuttle assembly to reciprocate within. The wall having fixed groove for elastomer shaft seal rings to seal around outside diameter of shuttle shaft and drilled passages for water entry to lubricate shaft seals. Air control end of shuttle assembly having set and release flange and internal bearing. Air release end of shuttle assembly cup shaped air release flange with bearing around outside diameter and seal means. Air control end of cylindrical housing having end cap drilled for air input means. The Air control end cap having bolt on shuttle support shaft with piston rings air input means air valving means and orifice means. The Release air end of cylindrical housing having attachable release air chamber sealing means and two air exhaust ports spaced opposite each other.

8 Claims, 5 Drawing Sheets

DEVICE FOR MARINE SEISMIC EXPLORATION FOR DEPOSITS

CROSS REFERENCE TO RELATED APPLICATIONS/CLAIM FOR PRIORITY

This application claims priority, under 35 USC §119(e), to U.S. Provisional Application Ser. No. 61/268,936 titled: DEVICE FOR MARINE SEISMIC EXPLORATION FOR DEPOSITS, filed on Jun. 18, 2009.

FIELD OF THE INVENTION

Air gun, as used herein, is used as a sound source for marine seismic exploration for petroleum deposit. Following herewith is a more general description of the air gun used for seismic oil exploration and details of which are known well to all of ordinary skill in this and in related fields of technology:

Air Gun System

Like the water gun, the air gun is also a pneumatic sound source. The system consists of an onboard high-pressure air compressor and storage tanks, a shipboard electrical firing circuit controlled by a seismic recording system, and one or more air guns towed astern of a survey vehicle/ship/boat. On command from the seismic recording system, the air gun releases a specified volume of high pressure air into the water. The resulting release of air produces a steep-fronted intense sound pulse.

Air Gun System Operation

The Armed and Fired Configuration of an Air Gun:

The acoustic signal is produced by the explosive release of high pressure air directly into the surrounding water, the water in which the air gun is immersed. Note that during firing, the so-called air gun piston has been driven upward at a high velocity into the upper/operating chamber, while high-pressure air exits the lower/firing chamber into the surrounding water.

The air gun requires a high-pressure air compressor on board the ship that yields an air pressure of 2000-3000 psi. For maximum resolution, the smallest chamber size is used. If maximum penetration is the goal, a larger chamber is configured, but resolution is lessened. Both guns (the smaller chamber and the larger chamber guns) have a stable and repeatable pulse in terms of frequency composition and amplitude and can be tuned to optimize the source signature.

Air guns generate more signal strength than boomer, and sparker, and chirp systems. The air gun is towed astern. The return signals are received by an array of towed hydrophones.

Air Gun System Usage

The air guns are relatively deep penetration sources, operating with output frequencies of between 10 to about 1200 Hz, to identify subsurface geologic layers and define the subsurface structure. In studies that require less resolution but substantial penetration, the air gun is usually preferable as compared to a water gun, because it is far more efficient at producing low frequency energy. It can be used in fresh or brackish (less saline) water found in lacustrine and estuarine environments. Both air guns (and water guns) can be used in shallow water surveys and relatively deeper water environments, achieving resolution on the order of 10 to 15 meters and up to 2000 meters penetration. With proper tuning, the air guns work well in a wide variety of bottom types. Minimum operating water depths of about 10 meters are possible in acoustically soft bottoms. In areas with acoustically hard bottoms, deeper water depths of operation are required.

BACKGROUND OF THE INVENTION/DESCRIPTION OF THE PRIOR ART

There are no patents of which the Applicant and the inventor of the now disclosed invention is knowledgeable and thus none can be noted herein. Applicant is providing herein all of the information and understanding known by Applicant hereof to exist relative to the improved functioning and control of basic air guns as used for marine seismic exploration. The present invention provides many advantages considered significant and valuable by the inventor hereof. The inventor hereof has additional patents such as U.S. Pat. Nos. 3,379,273, 4,038,630, 4,271,924, 4,599,712, 5,432,757, 7,269,099. There are also some other inventors in the same field such as Fiske, U.S. Pat. No. 4,757,482, and others in the field.

SUMMARY OF THE INVENTION

The invention hereof very clearly is identifiable, at the present time, to the use of a newly designed air gun which novel and unobvious air gun invention basically uses similar methods of currently built and used air guns, but new ways and manners for providing pressurized air, new ways to locate and maintain firing controler and firing instant transducer of the air gun and to "fire" the air gun, and a new assembly of a basic form of an air gun which new assembly has at least an attachable and easily removeable control of functionality and features of the basic air gun.

It is an object of this invention to provide an air gun of high acoustical output, it is another object of this invention to provide an air gun of high reliability and it is a further object of this invention to provide an air gun for easy and quick field repair and maintenance.

The present invention as disclosed and claimed herein is most simply and most generally a modified and functionally improved air gun having substantially the following features and elements.

It is basically:

The device hereof is an improved performance air gun as sound source for marine seismic exploration for petroleum deposits. The improved air gun has as basic components thereof, an elongated cylindrical housing bored from each end of the air gun structure, thereby creating two (2) bores, to a fixed radial wall separating the two bores. The fixed radial wall having a through bore for hollow shaft of air control and release shuttle assembly to reciprocate within. The wall having fixed groove for elastomer shaft seal rings to seal around outside diameter of shuttle shaft and drilled passages for water entry to lubricate shaft seals. Air control end of shuttle assembly having set and release flange and internal bearing. Air release end of shuttle assembly cup shaped air release flange with bearing around outside diameter and seal means. Air control end of cylindrical housing having end cap drilled for air input means. The Air control end cap having bolt on shuttle support shaft with piston rings air input means air valving means and orifice means. The Release air end of cylindrical housing having attachable release air chamber sealing means and two air exhaust ports spaced opposite each other. Of major value for this invention is the incorporation of a multi-purpose manifold assembly. This multi-purpose manifold assembly is designed to be reasonably attachable and removeable from the other components of the improved air gun and it provides to the air gun high pressure air input and pass through, electrical and electronic cable input and pass through, as well as a firing circuit air gun trigger solenoid valve and hanger yokes and is secured to a flat surface milled on top of an air gun housing

BRIEF DESCRIPTION OF THE DRAWINGS

Based upon the fundamental characteristics of this disclosed invention, there are drawings of significance that add to the disclosure explanation or definition of this invention. Drawings are therefore included herewith.

—FIG. 2 illustrates the input end side view, —FIG. 3 illustrates the output/firing end side view and—FIG. 5 illustrates the side cross sectional view of one of the air gun hanger yokes including the apertures for the signal cables and the high pressure air passageway.

DESCRIPTION OF THE INVENTION

An air gun of the present preferred form is clearly illustrated and shown in the included herewith, FIGS. 1-5. Even though the basic features or characteristics of this invention relates to some significant changes in the basic air gun structure, a full and detailed description of the improved air gun of this invention is provided herewith. Many of the fundamental structural features of this air gun are shown in the combination of drawings in the FIGS. 1-5 and many are not essential to the definition provided by the claims of the basic features of this invention but much detail of structure will be provided herewith.

Figure 1:
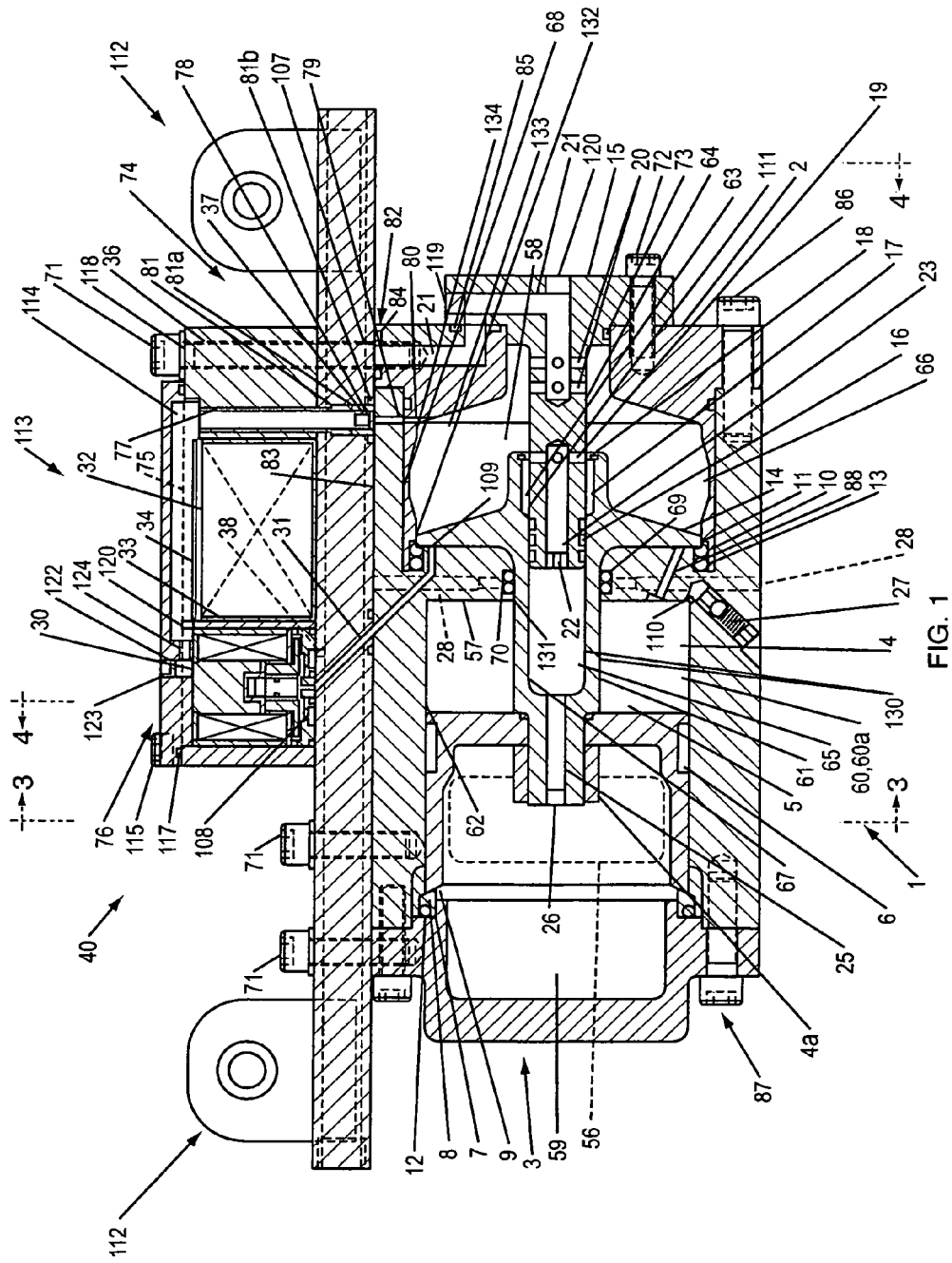
FIG. 1 is a longitudinal cross section view of the present invention showing the detail structural features including the assembly of the improved air gun including the multi-purpose manifold attached and functionally connected to the elongated cylindrical housing.
Figure 2:
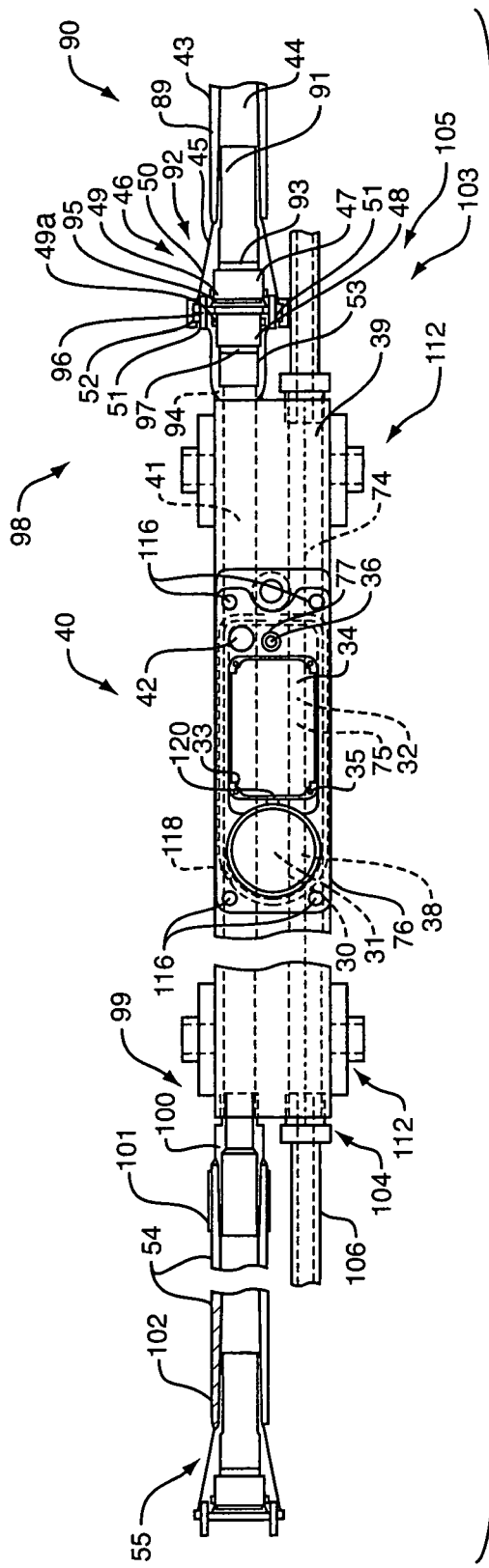
FIG. 2, FIG. 3 and FIG. 5 are cross sectional end views respectively illustrating the present invention
Figure 3:
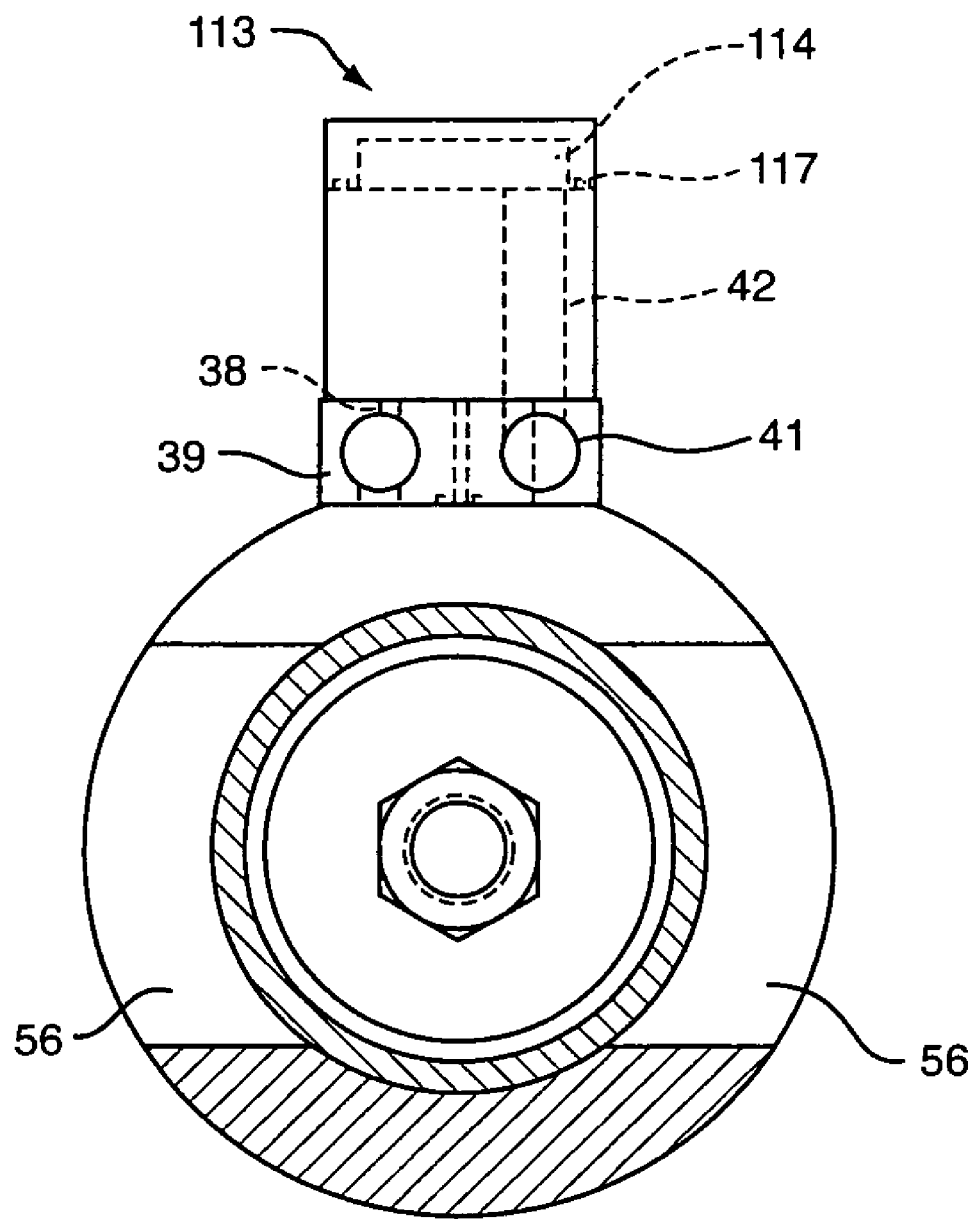
Figure 4:
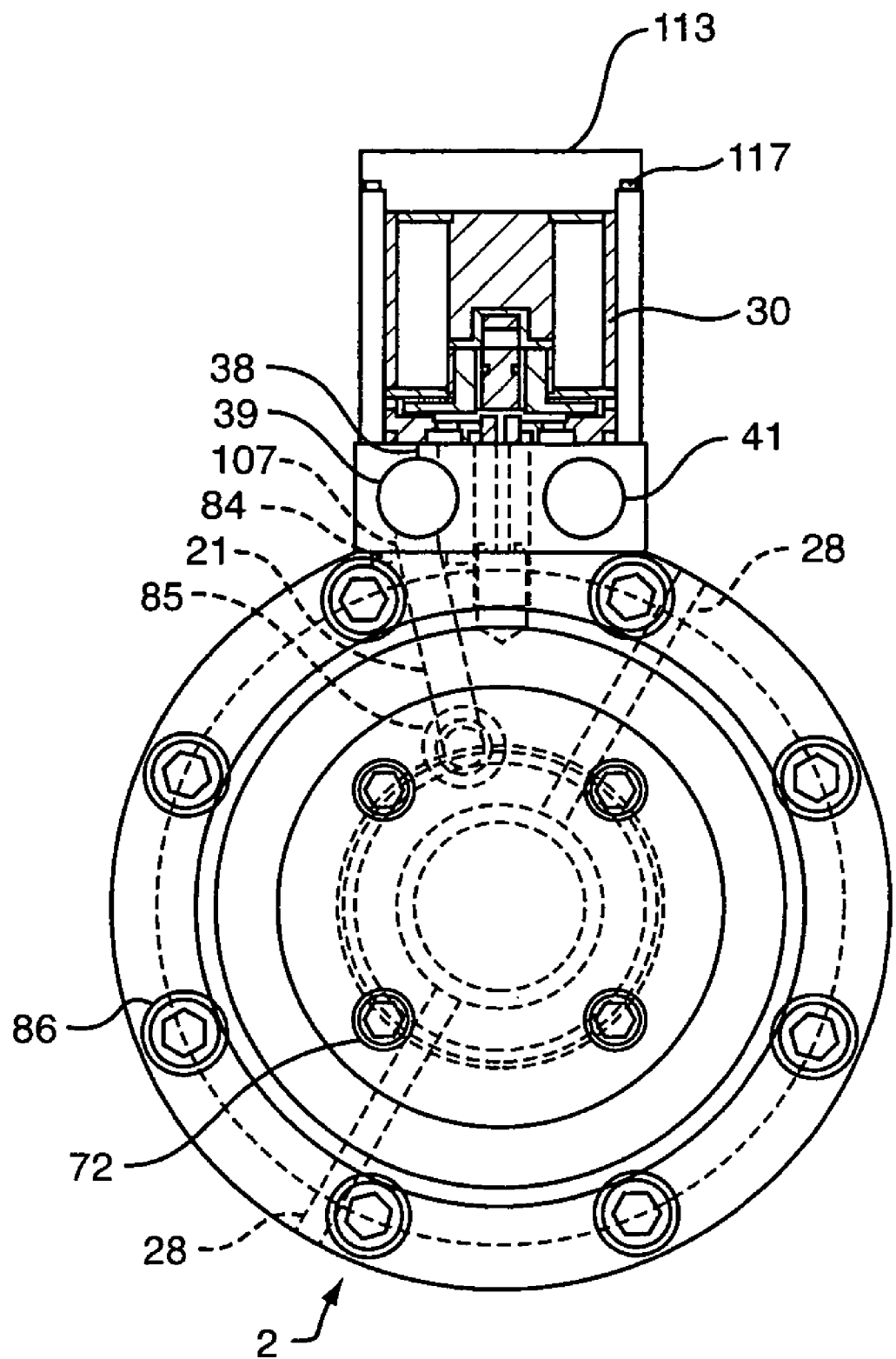
FIG. 4 is a longitudinal top view of the multi-purpose manifold of the present invention showing much of the detail structural features including the electrical control signal cables, the input cable and the air pressure supply conduit connected on the right side of the drawing and the output cable and the air pressure conduit both connectable or, connected to another improved air gun and illustrating, with dash line format, some detail of the control portion of the present invention.
Figure 5:
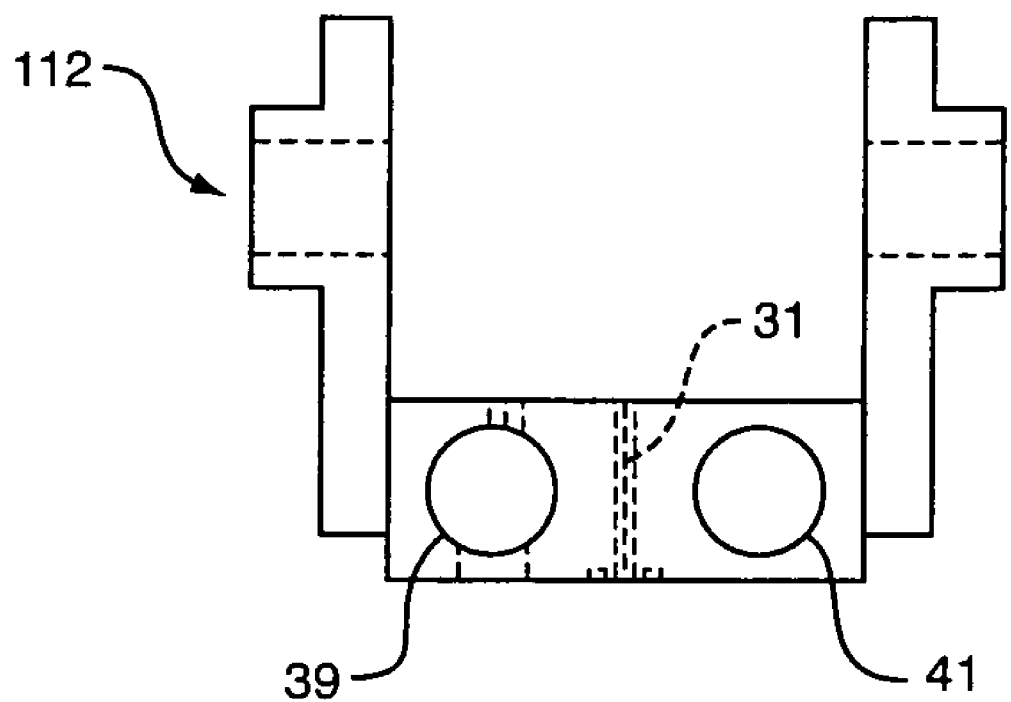

In the detail that follows, reference is most of the time made to FIG. 1 because FIG. 1 depicts the overall improved air gun of the present invention. Details of FIGS. 2, 3, and 5 display some of particular structural details for the invention. FIG. 4 is not referenced very frequently, but it does show a top view of a significant element—the multi-purpose manifold assembly 40.

As is shown in FIG. 1 the preferred air gun has a housing 1, having a first bore 62 a wall 57 at its approximate mid section and a second bore 68, wall 57 forms a barrier between a high pressure operating air chamber section 58 and ambient pressure air chamber 60 which forms the space 60A which air chamber cup flange 5 of shuttle valve assembly 4 moves into when the air gun is triggered. Wall 57 has a bored groove 70 which houses two shaft seals 69. Drilled holes 28 and 29, allow water to flow into the space between the seals for lubrication. Shuttle assembly 4 consists of a hollow shaft 61, an operating flange 14 and a release air chamber cup flange 5 held in place with nut 44 and sealed by o ring 121. Air chamber cup flange 5 is secured with nut 4A and has a split plastic rider ring bearing 6 which keeps it moveable and centered within bore 62 of air gun housing 1. The operating flange 14 seals in the set position, when shuttle assembly 4 is in the "cocked" or set position as pictured in FIG. 1 around its rounded outside diameter edge 11 against the inwardly beveled plastic or elastomer operating seal 10. Cup shaped release air chamber flange 5 seals in the set position around its outwardly beveled sealing face 9, against the inwardly beveled sealing face 8 of the plastic or elastomer release air seal 7. The shuttle valve assembly 4 has a bearing grade plastic sleeve bearing 17 fit into bore 63, retained by snap ring 18. Sleeve bearing 17 is bored to a close sliding fit to the shaft 64 of shuttle guide shaft assembly 15. Bore 62 has two opposite facing horizontal exhaust ports 56 from which the high pressure air volume 59 stored between shots in release air chamber 3 is released into the ambient water, generating a powerful sound impulse. The shuttle guide shaft assembly 15 keeps the shuttle assembly 4 centered in the air gun, but it is also the input conduit for high pressure air to flow into the operating chamber 58 and into the bores 65 and 25 of the shuttle 4, entering the operating chamber 58 through radial holes 20. Plugs 119 and 120 are welded in place. Taking notice to radial holes 19, as shown in FIG. 1, radial holes 19 are open to air flow into bore 23, but when the shuttle assembly 4 is in a position to the right of the set position, radial holes 19 are blocked by the bore 67 and bore 111 of shuttle assembly 4 acting to shut off air flow into bore 65 thru fill orifice 22. The shuttle guide shaft assembly 15 is secured to operating chamber head 2 by bolt circle 72. O ring seal 73 prevents high pressure air from leaking out from operating chamber 58.

The operating chamber 58 has a liner sleeve 66 which retains the operating seal 10 but also controls the airflow around the operating flange 14, as the shuttle 4 moves through its operating cycle from left to right and back again. Piston rings 16, two or more, seal between the inner bore wall 67 of the shuttle and the outside diameter of the shaft 64 of the shuttle guide shaft assembly 15, preventing high pressure air from flowing through that space into bore 65, thus allowing the fill orifice 22 to control the rate of air flow into release air chamber volume 59. When the air gin is triggered, the shuttle valve assembly 4 quickly moves from the set position as shown in FIG. 1 to the right while un-seating the rounded outside diameter edge 11, of the operating flange 14 and from the inwardly beveled sealing face 8 of the plastic or elastomer release air seal 7 and at the same time un-seating the outwardly beveled sealing face 9 of release air chamber cup flange 5 from the inwardly beveled face 8 of the plastic or elastomer release air seal 7. When this happens, the shuttle assembly moves very rapidly to the right, the open end of air chamber cup flange quickly passes the air release ports 57 allowing the high pressure air stored in release air chamber 59 to explosively out through exhaust ports 56.

Reference is made to FIG. 4 which displays a multi-purpose manifold assembly 40. (is multi purpose because it has in one unit, high pressure air input and pass through 39. electrical and electronic cable input and pass through 41, as well as the firing circuit 32 air gun trigger solenoid valve 30 and hanger yokes 112) is secured to a flat surface 83 milled on top of the air gun housing 1 by bolts 71. A water tight cover 113, has milled cavity 114 to provide space for electric wires coming up from electric passage conduit 41 through bore 42 as well as wires coming to the firing circuit 32 from transducer body 36 as well as wires to coil of solenoid valve 30 and for associated solder points on top of soldering terminal board 34. A slot 120 is milled between solenoid valve cavity 76 and firing circuit chamber 75 for wires to pass between. Water tight cover 113 is secured to top portion of two chamber housing 74 by four cap screws 115 (only one screw shown), screwed into threaded holes 116. An o ring seal 117 within groove 117G milled around perimeter of cover 113 seals between cover and top surface 118 of two chamber housing 74. (The groove is shown with dotted lines on top surface 118, is actually in the cover but its path is shown for illustrative purposes). An electronic firing circuit 32 is pre-packaged in a plastic container 33 which fits closely in firing circuit chamber 75, so that it can be removed for servicing or to facilitate changing. Manifold assembly 40 has a high pressure air passage 39 and conduit passage 41 for electric and electronic cables (cables not shown). A two chamber housing 74 contains firing circuit chamber 75 which contains electronic firing circuit 32 and a solenoid valve chamber 76 which contains solenoid valve 30, and bore vertical 42 which is a conduit for electric conductor wires to pass from pass through conduit bore 41 up into firing circuit chamber 75, to be connected at terminal board 34, for servicing firing circuit 32. Also within the housing is bore 77 which houses a transducer body 36 and the associated piezo electric transducer element 37 at the bottom portion 78. The bottom portion 78 is in fluid communication with drilled passage 79 and milled slot 80 into the top portion of operating chamber 58. O ring seals 81, 81A and 81B prevent high pressure air in operating chamber 58 from leaking either around the transducer body, or into the space between the bottom face 82 of the manifold assembly 40 and the flat milled top surface 83 of the air gun housing 1. Operating chamber head cap 2, is held in place with bolt circle 86, O ring seals 84 and 85 prevent high pressure air from leaking out from gun fill passage 21. The left end of FIG. 1 as shown, has a firing air chamber 3 affixed to gun housing 1 by bolt circle 87. The volume 59 of firing air chamber 3 as pictured is 20 cubic inches and the volume of the air chamber cup flange 5 is 30 cubic inches as pictured, together making a firing air volume of 50 cubic inches. Firing air chamber 3 can be produced and used, having volumes from ten or less cubic inches to two hundred cubic inches or more. O ring 12 prevents high pressure air stored within from leaking out and acts as well as a spring and centering device for plastic or elastomer release air seal 7 when the outwardly beveled sealing face 9 of the air chamber cup flange 5 is resting against the inwardly beveled sealing face 8 of plastic or elastomer release air seal 7. The operating seal 10 has an o ring seal 13 which prevents air from leaking from operating chamber 58, through vent passage 88 into ambient air pressure chamber 60.

Returning to multi-purpose manifold assembly 40. At the first end 98 of electric pass through conduit 41, there is a connector assembly 46, which has an input side 90 consisting of a tapered and barbed end 91 of input connector housing 45 which is held within a heavy duty reinforced hose conduit 43 secured by one or more band clamps 89. Within the mating end 92 of input connector housing 45, there is a first connector body 47 secured with snap ring 95, which houses connector sockets (not shown). The solder terminal points for electric cables are at input end 93 of first connector body 47. O ring 49 seals between housing 45 and first connector body 47.

A second connector housing 53 of connector assembly 46 is welded at 94 to the electric cable conduit bore 41 input end of multi-purpose manifold assembly 40 and houses second connector body 48. Connector body 48 contains the mating connector pins (not shown) which plug into the sockets of first connector body 47. The correct orientation of the connectors when being mated, is assured by stainless steel dowel pins 51. Two piece clamp ring 52 holds connector bodies 45 and 52 together (retaining flanges and bolts not shown). Solder terminal points at 97 provide electric connection for electric and electronic wires and cables as required by firing circuit 32, and for other air guns which may be rigged in tandem with the air gun illustrated. At the second end 99 of electric pass-through conduit 41, there is a heavy duty threaded and barbed hose fitting 100, threaded into the second end of electric pass-through conduit 41. A first end of heavy duty reinforced electric wire conduit hose 54 of length L, is fitted over the barbed portion of fitting 100 and secured by band clamp 101. The second end of hose 54, is fitted over the taper and barbed end of a second input connector housing 55 and secured by band clamp 102. Second input connector housing 55 is a duplicate of input connector 45 at the input end of electric cable conduit bore 41, but it is at the end of hose 54 of length L. Length L is long enough for desired spacing of another air gun next in line with in an array of air guns, and so on for each gun in each array. High pressure air pass through conduit 39, passes through multi-purpose manifold assembly 40 having high pressure air hoses 105 and 106 of length long enough to match the spacing provided by electric wire conduit hose 54 and threaded hose fittings 103 and 104, each threaded into an end of conduit 39 to bring high pressure air to and through the air gun. High pressure air pass-through conduit 39 has a branch off hole 107 drilled through the bottom surface of high pressure air conduit 39 and sealed from outward leakage by o ring seal 84, supplying high pressure air to input air passage 21 drilled into operating chamber head cap 2 an into the base of shuttle guide shaft assembly 15 thus supplying high pressure air through radial ports 20 and 19 to air gun operating chamber 58. Trigger valve high pressure air supply hole 38 is drilled through the top wall of air conduit 39 into position facing trigger valve air input chamber 108, enabling trigger valve to be supplied with high pressure air. When the trigger valve 30 is actuated by an electric pulse from firing circuit 32, a shot of high pressure air flows rapidly through trigger air passage 31 into annular space 109 to trigger the air gun. Air vent passage 88 is drilled through wall 57 near the bottom of operating chamber 58 and ambient air chamber 60, thus allowing the air pressure in the annular space 109 to be at ambient pressure when the shuttle valve assembly 4 has returned to the set position as shown in FIG. 1. Check valve 27 positioned for outward flow, receives water or air from ambient air chamber 60 through drilled port 110. If any water seeps into the ambient air chamber between air gun shots, it will be purged out through check valve 27 by the temporary air pressure build up in ambient air chamber 60 during the time the shuttle valve assembly 4 is moving from the set position as shown in FIG. 1, to the right, allowing some of the high pressure air to flow through drilled passage 88 into ambient air chamber 60 thus pressurizing the chamber 60 and pushing out any water which may have collected in the bottom out through check valve 27. Shuttle assembly 4 outside diameter shaft seals 70 prevent high pressure air from operating chamber 58 from leaking out through clearance 131, between the bore through wall 57 and the outside diameter of shuttle 4 shaft, when the shuttle is not in the set or cocked position.

Drilled holes 28 are a conduit for water to flow into and around shuttle outside diameter shaft seals 70 for the purpose of lubricating those seals for low friction when the shuttle assemble 4 is moving. When the shuttle assembly has returned to the set position the air pressure in ambient air chamber 60 returns to ambient. Plastic rider ring bearing 6 has a slightly smaller outside diameter than the bore 62 of airgun housing 1 allowing any remaining air pressure above ambient to seep out, or some water to seep into ambient air chamber 60 through exhaust ports 56, between air gun shots which occur about every eight seconds.

Air guns are used as generators of sound pulses used for seismic exploration of geological formations which may contain petroleum deposits beneath bodies of water. The air gun sound sources are towed behind exploration vessels in groups or arrays, of ten to thirty guns more or less. beneath the surface of the water at depths typically at approximately thirty five feet. An exploration ship will have an air compressor on board capable of firing the air gun arrays at a pressure one hundred thirty three bar more or less. A computer controlled air gun firing system on the exploration vessel controls and monitors the firing of the air guns. Reference is again made by the inventor hereof to some other patents of applicant/inventor hereof such as U.S. Pat. Nos. 3,379,273, 4,038,630, 4,271, 924, 4,599,712, 5,432,757, 7,269,099 and those of other inventors in the same field such as Fiske, U.S. Pat. No. 4,757, 482, and others in the field.

The present Air Gun invention has advantages over applicant/inventor hereof's previous air gun inventions in that the shuttle assembly 4 is guided at one end with a bearing 6 on the outside diameter of the cup flange 5 and by bearing 17 on the inside 63 of the operating flange 14 end of the shuttle, allowing the shuttle to be shorter allowing the gun to be shorter and lighter. The bearing 17 acts as a sliding valve as it passes ports 19 and 20 in the shuttle guide shaft 15. The greatest improvement over my past air gun inventions, is the feature of having a single multi-purpose manifold assembly 40 bolted to the gun housing 1 the firing circuit 32 and the trigger solenoid valve 30, as well as transducer body 36 housed within. Because the manifold assembly has pass through conduits 39 and 41 for high pressure air and electrical conductors respectively, the often unreliable jumper hoses and electric cable jumpers used in conjunction with my previous designs, are eliminated. The air supply for the trigger valve in the present invention comes directly through a drilled hole 38 in the air conduit 39 into the valve 30. The electric cables and wires passing through the electric cable pass through conduit, branch off into the vertical bore 42 and up directly into the firing circuit chamber 75. There is a pipe threaded hole 122 for pipe plug 123 in top of water tight cover 113 and a drilled passage 124 between the bottom portion of pipe threaded hole 122 and milled cavity 114. The purpose of these holes is for filling the electrical cavity and passages with an organic non toxic biodegradable oil for use to keep the wires and cables from moving or vibrating due to the movement caused by the firing of the air gun, thus lowering the possibility of wire breakage; another advantage of the present invention. Another advantage of having the valve mounted on the top side of the gun, is that the firing air passage 31 is shorter and less convoluted than with guns where the valve is mounted on the end of the air gun, thus the delay between triggering the valve and the firing of the gun is shorter and more accurately repeatable.

Another advantage of the present invention is, that the exhaust ports 56 face outward horizontally that when the gun is fired the high pressure air blasts out horizontally rather than in four or more directions as with guns with four or more ports. With air guns which the air blasts out vertically as well as horizontally, the water being rapidly pushed away rushes past the hangers, chains or cable the guns are suspended by. The force of this water pushing on the suspension means causes the suspension means to deflect in turn causing the gun to jump. This action causes wear and tear on the gun and suspension parts as well as the hoses and electric cables and wires. When the air blast comes out horizontally as in the present invention, it does not force water to rush against the suspension members.

Another advantage of this invention, is the way the operating seal 10 and the firing seal 7 are configured and operate. The operating seal 10 is inwardly beveled so that when high pressure air is introduced into the operating chamber 58 and the shuttle assembly moves to the set position as shown in FIG. 1, the rounded outside diameter edge 11 of the operating flange 14 seals against it and as pressure builds in the operating chamber 58, the pressure building up on the outside diameter of operating seal 10 and its backup o ring springseal, forces them slightly inwardly, as the operating flange 14 of the shuttle assembly 4 is moving the last small fraction of an inch, towards the set position against surface 125 of wall 57, assuring an air tight seal. The same type of sealing action occurs at the release air seal 7, except that as the pressure 59 builds in the release air chamber 3, builds up on the inside diameter of the release air seal 7 assisting its sealing ability against the outwardly beveled sealing face 9 of the air chamber cup flange 5. Fill air control orifice 22 controls the rate at which high pressure air flows from operating chamber 58 into shuttle assembly bore 65 and through drilled passage 25 then into release air chamber 3.

To Operate the Air Gun, which has been Placed in Water where it is to be Used, the following steps are to be followed:

A valve on board the exploration ship (not shown) is turned to the on position allowing regulated high pressure air to flow from the ships air pressure supply into hose line 105 which may be as long as one hundred feet more or less, into air pass through conduit 39 of multi-purpose manifold assembly 40 and into operating chamber 58, through drilled air passage 21. No matter what position shuttle valve assembly 4 is in, it will be pushed by the building pressure in operating chamber 58, by acting of the area 130 presented by the difference in diameter between the inside diameter bore 67 and the outside diameter 61 of the shuttle valve assembly shaft, to the left as shown in FIG. 1 until the rounded outside diameter 11 of the operating flange 14 seals against operating seal 10 and at the same time outwardly beveled face 9 of the shuttle assembly cup flange 5 seals against inwardly beveled face 8 of release air seal 7. High pressure air fills release air chamber 3 volume 59 until the pressure in it is equal to the pressure in operating chamber 58. At this point, the air gun is in the "cocked" pressurized state and ready to fire. It should be noted, that in the cocked state, the air gun is in a state of equilibrium, by the virtue of the fact that the surface area of the operating flange 14 presented to high pressure air in operating chamber 58 of the shuttle assembly 4 is a little larger than the surface area of the shuttle assembly cup flange 5 presented to the high pressure air 59 in release chamber 3, while the air pressure in ambient air chamber 60 is presented to the inside side of both flanges, thus there is more force holding the shuttle valve assembly 4 in the somewhat stable cocked position and ready to be triggered.

Power supply and triggering wires or cables come from the control station on board the exploration ship and pass current and triggering control signals to the firing circuit 32 through inside conduit 44 of protective hose 43 into and through connector assembly 46 into electric wire and cable conduit bore 41, into bore 42, to firing circuit 32. As the exploration vessel moves through the water towing one or more air gun through the water electric signals from the control center on the vessel cause the capacitor part of the firing circuit to discharge its charge into the coil 126 of solenoid valve 30 causing the armature 127 of the valve to lift up allowing a shot of high pressure air to flow valve air input passage 38 into valve air input area 108 past seal faces 128, through valve output bore 129, into drilled firing air passage 31, then into the circular groove 109 around the inside face of shuttle operating flange 14. The shot of high pressure air introduced into circular groove 109, causes the shuttle assembly to move enough to break the seal between the rounded outside diameter 11 of the shuttle operating flange 14 and operating seal 10, allowing high pressure air from operating chamber 58 to flow rapidly into the developing space between wall 57 and operating flange 14, which removes the equalizing the pressure on both sides of flange 14. At the point of pressure equalization around flange 14, there still remains the high pressure air 59 in release air chamber 3, which is pushing on the release air chamber side of the cup flange 5 which in the configuration pictured in FIG. 1 is about thirty three square inches of area and at a typical firing air pressure of two thousand pounds per square inch, results in a force of sixty six thousand pounds of force pushing on a shuttle assembly weighing a few pounds. There is however a force opposing the accelerating of the shuttle assembly and that is the force of the high pressure air in operating chamber 58 pushing on the area 130 described by the difference between the outside diameter 61 and the diameter shuttle shaft bore 67 which area 130 is about one square inch, producing in comparison the small force of two thousand pounds. The shuttle assembly abruptly moves from the cocked position as shown in FIG. 1 to the right, opening the ports to the surrounding water producing a loud report as the air exits the ports explosively. As the shuttle assembly nears the end of its travel to the fully open position, it is slowed and stopped by air compressing in operating chamber 58 and ambient air pressure chamber 60 and at the same time, the air in air release chamber 3 drops to nearly ambient as most of it exits the exhaust ports 56, while air pressure in operating chamber 58 remains high and pushing on area 130 reverses the direction of shuttle assembly 4 returning it to set position as pictured in FIG. 1. The purpose of operating chamber bore 68 liner sleeve 66, is to control the flow of high pressure air around the outside diameter as the shuttle 4 is moving through its cycle each time the air gun is triggered. From the cocked position when triggered, as the shuttle starts to move, air flows through clearance 132 between the outside diameter of shuttle operating flange 14 and the bore 133 of liner sleeve 66 allowing the shuttle to accelerate. When the operating flange 14 moves up to the middle area of the sleeve 66 where the bore has tapered to a larger diameter the air moves easily around the flange 14, allowing the shuttle assembly 4 to accelerate more rapidly. When the shuttle assembly nears the top of its stroke, it travels at high speed, but when it enters bore 134 which is slightly larger than the outside diameter of flange 14, the air trapped there compresses, slowing the shuttle, at the same time air 60A is being compressed in ambient air chamber 60, also slowing the speed of shuttle and stopping it before metal to metal contact happens. The shuttle next reverses direction, being pushed back to the set position by high pressure air in operating chamber, acting on area 130. As operating flange 14 of shuttle assembly 4 approaches the set position it re-enters the smaller diameter bore of liner sleeve 66 with the small clearance 132, compressing the air trapped between flange 14 and wall 57, thus slowing the shuttle assembly before it reaches the set position. When the shuttle has returned to the set position the operating flange 14 seals against operating seal 10 while the outwardly beveled face 9 of cup shaped release air chamber flange 5, seals against inwardly beveled sealing face 8 of the plastic or elastomer release air chamber seal 7. High pressure air stored in operating chamber 58 and high pressure air coming into the air gun through drilled air passage 21 now flows through cross drilled ports 19 into drilled passage 23 through flow control orifice 22 through shuttle bore 65 through drilled air passage 25 to fill volume 59 of release air chamber 3, equalizing at the same pressure as in operating chamber 58. The air gun is now cocked and ready for the next shot.

What is claimed is:

1. An improved performance air gun as sound source for marine seismic exploration for petroleum deposits and said improved air gun comprising:
   an elongated cylindrical housing bored from each horizontal directed ends creating thereby a first bore and a second bore;
   a fixed radial wall separating said two bores, said fixed radial wall having a through bore for a hollow shaft for air control;
   a release shuttle assembly to reciprocate within said fixed radial wall; a fixed groove for placement of elastomer shaft seal rings within said fixed radial wall;
   a shuttle shaft having an outside diameter thereof sealed by said shaft seal rings; water entry passages for water entry to lubricate shaft seals;
   said release shuttle assembly having a set flange and a cup shaped air release flange and internal bearing;
   an air release end of said release shuttle assembly with said cup shaped air release flange and said internal bearing around outside diameter of said cup shaped air release flange;
   said elongated cylindrical housing having means for air input and said air release end having a bolt on said shuttle shaft with piston rings, means for providing air input, means for air valving and means for providing an orifice; and
   attachable release air chamber means for sealing and two air exhaust ports spaced opposite each other positioned at release air end of said elongated cylindrical housing and said ports directing said released air in a direction substantially perpendicular to axial direction of said elongated cylindrical housing.

2. The improved performance air gun according to claim 1 further comprising:
   a removably attachable multipurpose manifold said manifold comprising;
   means for providing air input,
   means for providing electrical signal input,
   firing circuit chamber as a means for firing said air gun,
   a solenoid valve chamber,
   means for housing a transducer, and
   a firing air passage.

3. The improved air gun according to claim 2 further comprising milled flat for mounting said multipurpose manifold.

4. The improved performance air gun according to claim 1 further comprising: an air gun hanger yoke system providing retention and support for said air gun while in use.

5. A method of using an improved air gun as a sound source for under water seismic exploration, including the steps of:
   attaching to said improved air gun an elongated manifold assembly having parallel air supply and electrical conduit by-pass bores including an air output port and an electrical cable output port;
   submerging said air gun in water and firing said air gun to create underwater sound pulses.

6. The method of using said improved air gun as a sound source for underwater seismic exploration according to claim 5 including the steps of:
   taking said improved air gun from the water and without disturbing any air or electrical hoses or conduits, replacing said air gun with another similar air gun and returning said similar replaced improved air gun to the water to continue to create underwater sound pulses.

7. The method of using said improved air gun as a sound source for underwater seismic exploration according to claim 5 including the steps of:

taking said improved air gun from the water and without disturbing said improved air gun;

disconnecting the assembly of the elongated manifold and modular length of electrical conduit hose assembly;

replacing said assembly with another similar assembly of elongated manifold and modular length conduit hose assembly; and returning said improved air gun to the water to create underwater sound pulses.

8. The method of using said improved air gun as a sound source for underwater seismic exploration according to claim 5 including the steps of:

taking said improved air gun from the water and without separating the air gun and manifold assembly or disturbing any air hoses or electrical conduit hoses;

removing a cover from a top portion of said manifold assembly;

removing any one or combination of valve assembly parts or firing circuit parts or transducer parts and subsequently replacing the removed parts with similar parts;

replacing said cover to the top of the elongated manifold assembly; and returning said improved air gun to the water to create underwater sound pulses.

* * * * *